United States Patent [19]

DeGrose

[11] 4,412,526
[45] Nov. 1, 1983

[54] WATER TEMPERING SYSTEM

[76] Inventor: Louis DeGrose, 154 Elizabeth St., Pittston, Pa. 18640

[21] Appl. No.: 225,034

[22] Filed: Jan. 16, 1981

[51] Int. Cl.³ .............................................. F24H 9/12
[52] U.S. Cl. .................................. 126/365; 122/20 B; 165/DIG. 12; 237/8 R; 237/19
[58] Field of Search ...................... 126/365; 122/20 B; 165/DIG. 12; 237/8 R, 19

[56] References Cited

U.S. PATENT DOCUMENTS

| | | | |
|---|---|---|---|
| 2,166,355 | 7/1939 | Higgins et al. | 126/365 |
| 2,521,462 | 9/1950 | Kinzelmann | 126/365 |
| 2,689,560 | 9/1954 | Johnson | 237/19 |
| 3,007,470 | 11/1961 | Heeger | 237/19 |
| 4,037,779 | 7/1977 | Roy et al. | 237/8 R |
| 4,090,474 | 5/1978 | Kauffmann | 122/20 B |
| 4,175,518 | 11/1979 | Reames, Jr. | 122/20 B |
| 4,210,102 | 7/1980 | Dosmann | 237/19 |
| 4,230,267 | 10/1980 | Dotschkal et al. | 237/8 R |
| 4,232,657 | 11/1980 | Killorin | 237/8 R |

Primary Examiner—Ronald C. Capossela

[57] ABSTRACT

A water tempering system for preheating water comprises a storage tank for tempered water; a water tempering unit containing S-shaped heat exchange tubes positioned in the exhaust flue of a furnace; first conduit means for conveying water from the storage tank to the tempering unit; and second conduit means for conveying water from the tempering unit to either the storage tank or an outlet tube for the water tempering system.

7 Claims, 3 Drawing Figures

WATER TEMPERING SYSTEM

BACKGROUND OF THE INVENTION

The present invention relates to water heating apparatus as commonly used in homes and, more particularly, to a water tempering system which provides a means for recycling water through a heat exchange means.

One common type of water heating system utilizes water circulation devices to recover heat from flue gases and the like. In this type of system, water is circulated through a heat exchange means in an exhaust flue and returned to a storage tank to increase the water temperature in the storage tank. Examples of such systems are exemplified in U.S. Pat. Nos. 3,705,574; 3,958,555; 3,999,709; 4,037,567; 4,037,786; 4,090,474; 4,136,731; and 4,175,518.

SUMMARY OF THE INVENTION

The water tempering system of the present invention overcomes economic and efficiency drawbacks with the prior art by providing a high-efficiency, low-cost means for increasing the temperature of water contained in a tempering tank. This is accomplished by constructing a heat exchange system consisting of a tempering tank; a water tempering unit positioned in the exhaust flue of a furnace; a first conduit means for carrying fluid from the tempering tank to the tempering unit; an outlet conduit connected to a conventional water heating unit; and a second conduit means for conveying water from the tempering unit to either the outlet conduit or the tempering tank. When flue gases flow through the tempering unit, fluid is circulated from the tempering tank, through the tempering unit, and, depending upon the demand for water, the tempered water is fed either to the outlet conduit for domestic use or to the tempering tank.

Accordingly, an object of the present invention is to provide a water heating system which is comprised of simple, durable parts and components that can be economically manufactured and readily assembled.

Another object of this invention is the provision of an improved water heating system which is designed and constructed so that it can be retrofitted to existing hot water systems.

A further object of the invention is to provide a means for recovering heat from the waste gases produced by residential and industrial heating processes.

Yet another object of this invention is to provide for the preheating of cold water and for the recirculation of water in a storage tank to increase the average temperature of the stored water.

Still another object of the invention is to provide a heating apparatus for water which efficiently circulates water through a preheater device during periods of time when water is not being drawn off for use.

BRIEF DESCRIPTION OF THE DRAWINGS

The novel features which are believed to be characteristic of this invention are set forth with particularity in the appended claims. The invention, however, both as to its organization and the method thereof disclosed herein, together with further objects and advantages thereof, may be best understood by reference to the following description taken in conjunction with the accompanying drawings, in which:

DETAILED DESCRIPTION OF THE INVENTION

Figure 1:
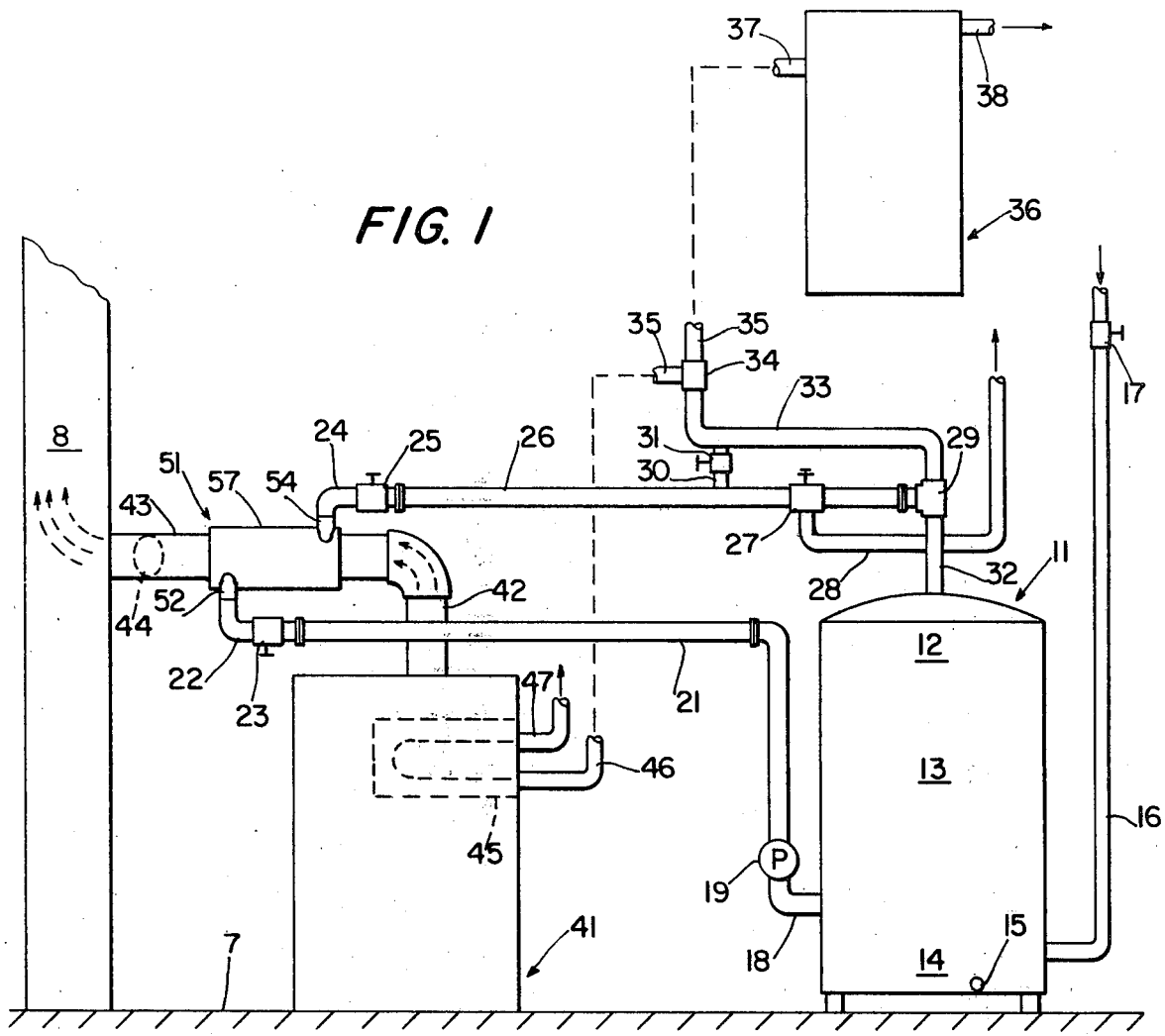
FIG. 1 is a schematic drawing of the water apparatus of the present invention.
Figure 2:
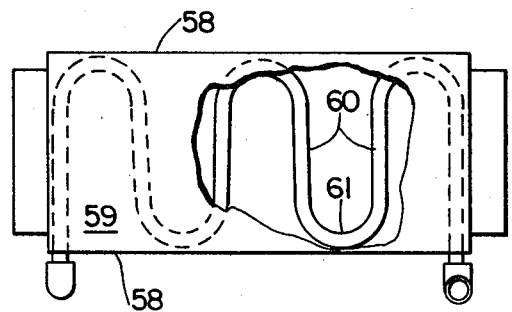
FIG. 2 is a side view of the water tempering unit of the present invention.
Figure 3:
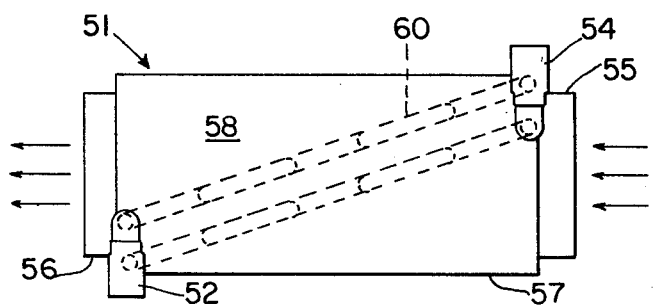
FIG. 3 is a top view, partially broken away, of the water tempering unit of the present invention.

Referring now to the drawings and to FIG. 1 in particular, there is shown a diagramatic view of a water tempering apparatus of the present invention. As depicted in the drawings, the main components of the water tempering system include: a water tempering tank 11 supported on the floor 7 of a basement or the like; a water tempering unit 51 mounted between flue pipes 42,43 of furnace 41; and associated pipes and conduit means for conveying water between the tempering tank 11 and the tempering units 51.

Although the exhaust ducts 42,43 of FIG. 1 are utilized to convey exhaust gases from a heating furnace 41 to a chimney 8, the exhaust ducts can be taken as representative of any hot gas exhaust duct extending from a combustion device such as a furnace, an incinerator, or any other fossil fuel combustion unit. The furnace 41 of the illustrated embodiment, which may be fired by gas, oil or other combustible material, is normally operated in accordance with the demands of the central heating system without regard to the operation of the present water heating system, except, for example, where a tankless water heater unit 45 is incorporated into the furnace 41. Thus, in general, exhaust gases will be used to pre-heat or temper the water during the winter months, and during the summer an important degree of water tempering will occur as the tempering tank 11 draws heat from the surrounding environment to raise the relatively cold inlet water to room temperature.

Water from the community water system enters the bottom portion 14 of the tempering tank 11 through an inlet pipe 16, which is provided with a conventional cutoff valve 17. The inlet water, which normally has a seasonal temperature range between about 35 and 60 degrees Fahrenheit, is relatively colder than the water in the upper and intermediate portions 12,13 of the tempering tank 11 so that the bottom portion 14 forms a buffer zone for precluding overheating of the recycled water. Water in the bottom portion 14 flows out of the tempering tank 11 through a first conduit means in the form of a first outlet pipe 18, an elongated riser pipe 21 which is slightly inclined with respect to the horizontal plane, and a short pipe section 22 provided with a cutoff valve 23. The water is then fed through the tempering unit 51 to a second conduit means in the form of a short pipe section 24 provided with a valve means 25, an elongated riser pipe section 26 which is slightly inclined with respect to a horizontal plane, and pipe sections 30, 32, and 33. If the demand for hot water is negligible, the heated or tempered water from tempering unit 51 is recycled to the tempering tank 11 through pipe connections 29 and pipe section 32. Conversely, if hot water is being drawn off for domestic use, the tempered water from tempering unit 51 is normally fed through bypass pipe means 30 to outlet pipe section 33, and when the demand exceeds the flow rate of water from tempering unit 51, additional tempered water is drawn from the upper portion 12 of tempering tank 11.

Circulation of tempered water through the tempering unit 51 may be produced by recirculation means such as the convection currents developed in tempering unit 51 and inclined pipe sections 21, 26, and pump means 19 in outlet pipe section 18. More particularly, for example, the flue gases passing through the tempering unit 51 raise the temperature of the water in the heat exchange pipes 60 of tempering unit 51 and cause a migration of the heated water into inclined pipe section 26. Concurrently, the relatively cold water in inclined pipe section 21 is drawn into heat exchange pipes 60. The gradual incline of pipe sections 21, 26 generally precludes the devlopment of "hot" zones and allows a more even flow of water therethrough. While normal domestic use of hot water and the large heat sink provided by the tempering tank 11 will prevent overheating of water by the flue gases, a pressure relief means in the form of an adjustable pressure relief valve 27 and overflow pilpe 28 is coupled with pipe section 26. As shown in FIG. 1, the pressure relief valve 27 is positioned at the "high" end portion of pipe section 26, between bypass pipe 30 and pipe connection 29 so that hot water passing through pipe section 26 effectively mixes with water in bypass pipe 30 and pipe section 32 to allow a uniform measure of the pressure/temperature in the tempering apparatus. It is also evident that pipe sections 26, 30, and 32 can be arranged so that gases produced in the water in tempering unit 51 can be efficiently removed at valve 27.

The tempering unit 51 comprises a hollow housing 57 provided with coupling ducts 55, 56 at opposite ends of the housing 57 for attachment with the respective exhaust ducts 42 and 43. The housing 57 also includes an inlet pipe 52 connected to one end of the housing 57, and an outlet pipe 54 connected to the other end portion of the housing 57 adjacent the top plate 59. Extending between the inlet and outlet pipes 52, 54 are heat exchange pipes 60 arranged in a serpentine pattern of interconnected S-shaped tubes. The serpentine configuration of the freely supported heat exchange tubes 60 accommodates differential thermal stresses produced in the tubes by expanding both transversely and longitudinally of the housing 57 with increasing operational temperatures, wherein the longitudinal expansion of curved portions 61 tends to produce a more pronounced serpentine pattern. The housing 57 is constructed so that the cross-sectional area of the housing is larger than the cross-sectional area of the adjacent exhaust ducts 42, 43 so that the flow of exhaust gases therethrough is not restricted, and more efficient heat transfer therebetween is permitted. Preferably, the housing 57 is provided with a removable faceplate 58 to permit periodic cleaning of the housing interior, and the surfaces of the heat exchange pines 60 may be coated with black paint or other means to optimize heat transfer while reducing thermal corrosion of the pipes 60. The heat exchange or tempering unit 51 is connected to the exhaust ducts 42, 43 so that hot exhaust gases from the furnace 41 initially contact the heat exchange pipes 60 in the upper portion of the housing 57 adjacent outlet pipe 54. Thus, the water is arranged to flow upwardly through the heat exchange pipes 60 in opposite directions to the flow of the exhaust gases so that air pockets and "hot" spots, which might otherwise reduce the flow of fluid therethrough, are not developed.

For a water heating system of the type having a tankless heater 45, as shown in FIG. 1, the demand for hot water causes the water to be initially drawn through pipe sections 46, 47. Depending upon the temperature of the water and the setting of the aquastat (thermostat) for the tankless heater 45, the furnace 41 may be turned on to raise the water temperature to a predetermined level. When the furnace 41 is turned on to raise the water temperature in the tankless heater 45, the exhaust gases from the furnace 41 pass through the tempering unit 51 and raise the temperature the water in the heat exchange pipes 60. Concurrently, water begins to circulate through the tempering unit 51 as a result of, for example, the convection currents developed therein and pump means 19 in pipe section 18. The pump means 19 may be controlled by a sensing unit (not shown) in the furnace 41 or in the tankless heater 45 so that the pump means 19 beings to operate as the furnace 41 beings to heat the water in the tankless heater 45. The heated water from the tempering unit 51, which normally has a temperature range of between about 130 and 180 degrees Fahrenheit, passes through pipe section 26, bypass pipe 30, and pipe sections 33, 34, 35 to the tankless heater 45. As mentioned above, the bypass pipe 30 delivers heated water from the tempering unit 51 directly to tankless heater 45 without mixing with the water in the tempering tank 11. In the event that the demand exceeds the flow rate through the bypass pipe 30, water is also drawn out of the upper portion 12 of the tempering tank 11, wherein the temperature of the water in the upper and intermediate regions of the tempering tank 11 is usually between about 95 115 degrees Farhenheit. After the demand for heated water has ceased and the flow of hot water through tankless heater 45 has been discontinued, the furnace 41 may continue to run for a predetermined period of time and the hot water from the tempering unit 57 will flow into the tempering tank 11 through pipe section 32.

With situations where the furnace 41 is operated for heating purposes in addition to heating the water in tankless heater 45, there will be periods of time when the water is being heated in tempering unit 51 and no hot water is being drawn off for home use. For this case, the heated water in tempering unit 51 is fed through pipe sections 26, 32 and introduced into the upper portion 12 of the tempering tank 11. As a result of the configuration and arrangement of pipe sections 16, 18, and 32 the hottest water tends to remain in the upper portion 12 of the tempering tank 11 and remain available for immediate use. If the water in tempering tank 11 is recirculated and heated for substantial period of time, the "hot" zone extends downwardly into the intermediate portion 13 and perhaps the lower portion 14 of the tempering tank 11. However, because of heat radiation from tempering tank 11 and due to periodic use of the tempered water with replacement thereof by cold water from inlet pipe 16, it is unlikely that the tempering tank will become heated to temperatures approaching 180 degrees Fahrenheit. The lower portion 14 of the tempering tank 11 which is below outlet pipe 18 contitutes a "cold" zone in which the water temperature is on the order of about 60 degrees Fahrenheit. It is noted that the outlet for pipe section 18 is positioned above the bottom of the tempering tank 11 to preclude circulation of sediment and other debris accumulated in the bottom of the tempering tank 11. Such debris is normally removed by periodically opening drain 15.

When a water heating unit 36 having its own heat supply is utilized instead of the tankless heater 45, the operation will be as described above, except that the water will be tempered by exhaust gases only when the furnace 41 is operated for heating purposes. Since this will occur only during the winter heating months, the water tempering occurring during the summer months will result from the tempering tank 11 functioning as a heat sink to draw heat from the surrounding environment. With a water heating system having a self-contained water heating unit 36, tempered or heated water in the storage or tempering tank 11 is fed directly through pipe sections 33,34,35 to inlet 37 of water heating unit 36 for further heating, and then is fed to outlet 38. To permit such direct flow of water from storage tank 11 to water heater 36, shut-off valves 23, 25, and 31 may be closed during the months when the furance 41 is not in operation.

Obviously many modifications and variations of the present invention are possible in light of the above teachings. It is therefore to be understood that within the scope of the appended claims the invention may be practiced otherwise than as specifically described.

What is claimed is:

1. A water heating apparatus for recovering energy from exhaust gases flowing through an exhaust duct connected to a source of heat, said water heating system comprises:
    a heat exchange means mounted to receive the exhaust gases and containing fluid passage means extending therethrough for conveying water through said heat exchange means so that the water is heated by the exhaust gases;
    a storage tank for storing tempered water from said heat exchange means;
    a first conduit means for conveying water from said storage tank to said heat exchange means; and
    a second conduit means for conveying heated water from said heat exchange means to said storage tank, said second conduit means includes an outlet tube for conveying tempered water out of the water heating apparatus, wherein said second conduit means comprises:
    a discharge pipe section connected to an outlet of said heat exchange means, said discharge pipe is slightly inclined with respect to a horizontal plane for encouraging uniform flow of heated water therethrough;
    an outlet duct connected to said discharge pipe section in which one end portion of said outlet duct is connected to the upper portion of said storage tank and the other end portion of said outlet duct is connected to said outlet tube of the water heating apparatus; and
    a bypass pipe section connected to said discharge pipe and said outlet tube of the water heating apparatus for conveying heated water directly from said heat exchange means to the outlet of the water heating apparatus without mixing with the wter in said outlet duct.

2. The apparatus according to claim 1, further comprising:
    a pressure relief means connected to said discharge pipe of said second conduit means for releasing fluid therefrom when the fluid pressure in said pressure relief means reaches a predetermined level, said pressure relief means is disposed between said bypass pipe section and said outlet tube.

3. The apparatus according to claim 2, wherein said fluid passage means of said heat exchange means comprises:
    an inlet at one end portion of said heat exchange means;
    an outlet at the other end portion of said heat exchange means; and
    a plurality of interconnected S-shaped pipe sections connected to said inlet and outlet, said heat exchange means is positioned within the flow of exhaust gases so that the flow stream of exhaust gases contact portions of said S-shaped pipe sections adjacent said outlet before contacting downstream portions of said S-shaped pipe sections adjacent said inlet, and said S-shaped pipe sections are freely supported and configured to accommodate thermal expansions and contractions of said S-shaped pipe sections.

4. The apparatus according to claim 3, wherein said first conduit means comprises:
    an outlet pipe section connected to the lower portion of said storage tank;
    an elongated intermediate pipe section coupled to said outlet pipe section and said heat exchange means, said intermediate pipe section provided with a cut-off valve for terminating the flow of water therethrough, and said intermediate pipe section is slightly inclined with respect to the horizontal plane for allowing a uniform flow of water therethrough; and
    means for conveying water through said outlet pipe section and said intermediate pipe section to said heat exchange means.

5. The apparatus according to claim 4, wherein said outlet tube is connected to a water heating unit for further heating the water from the outlet tube and for maintaining the water temperature at a predetermined level, and said conveying means includes a pump means coupled with said first conduit means and operative in response to the flow of exhaust gases through said heat exchange means for conveying water through said S-shaped pipe sections.

6. A water heating apparatus for recovering energy from exhaust gases flowing through an exhaust duct connected to a source of heat, said water heating system comprises:
    a heat exchange means mounted to receive the exhaust gases and containing fluid passage means extending therethrough for conveying water through said heat exchange means so that the water is heated by the exhaust gases;
    a storage tank for storing tempered water from said heat exchange means;
    a first conduit means for conveying water from said storage tank to said heat exchange means; and
    a second conduit means for conveying heated water from said heat exchange means to said storage tank, said second conduit means includes an outlet tube for conveying tempered water out of the water heating apparatus, wherein said storage tank comprises:
    a lower portion, said lower portion having an inlet pipe for receiving unheated water from a source of supply, and said first conduit means is connected to said lower portion for conveying the water in said lower portion of said storage tank to said heat exchange means;
    an upper portion, said upper portion is connected to said second conduit means for receiving heated water from said heat exchange means and for supplying heated water to said outlet tube when the demand for water at said outlet tube exceeds the flow rate of water through said heat exchange means; and an intermediate portion situated between said upper and lower portions, the water in said intermediate portion forming a buffer zone between the water in said upper portion and the relatively colder water in said lower portion.

7. A water heating apparatus for recovering energy from exhaust gases flowing through an exhaust duct connected to a source of heat, said water heating system comprises:

a heat exchange means mounted to receive the exhaust gases and containing fluid passage means extending therethrough for conveying water through said heat exchange means, said heat exchange means comprising an inlet at one end portion of said heat exchange means, an outlet at the other end portion of said heat exchange means and said outlet is positioned at a higher elevation than said inlet, and a plurality of interconnected inclined S-shaped pipe sections connected to and extending between said inlet and outlet, said heat exchange means is positioned within the flow of exhaust gases so that the flow stream of exhaust gases contacts portions of said S-shaped sections adjacent said outlet prior to contacting downstream portions of said S-shaped pipe sections adjacent said inlet, and said S-shaped pipe sections are freely supported and configured to accommodate thermal expansions and contractions of said S-shaped pipe sections;

a vertical storage tank for storing tempered water from said heat exchange means, said storage tank comprising a lower portion having an inlet pipe for receiving unheated water from a source of supply, an upper portion connected to said heat exchange means for receiving heated water from said heat exchange means, and an intermediate portion situated between said upper and lower portions, and the water in said intermediate portion forming a buffer zone between the water in said upper and lower portions of said storage tank;

a first conduit means for conveying water from said storage tank to said heat exchange means, said first conduit means comprising an outlet pipe section connected to said lower portion of said storage tank, an elongated intermediate pipe section coupled to said outlet pipe section and said inlet of said heat exchange means, and pump means for conveying water through said outlet pipe section and said intermediate pipe section to said heat exchange means;

a second conduit means for conveying heated water from said heat exchange means to said storage tank, said second conduit means comprising an elongated discharge pipe section connected said outlet of said heat exchange means, an outlet duct connected to an end of said discharge pipe section and one end portion of said outlet duct is connected to the upper portion of said storage tank and the other end portion of said outlet duct is connected to said outlet tube of the water heating apparatus, and a bypass pipe section connected to an intermediate portion of said discharge pipe section and said tube for conveying heated water directly from said heat exchange means to said outlet tube without mixing with the water in said outlet duct.

* * * * *